Figure 1:
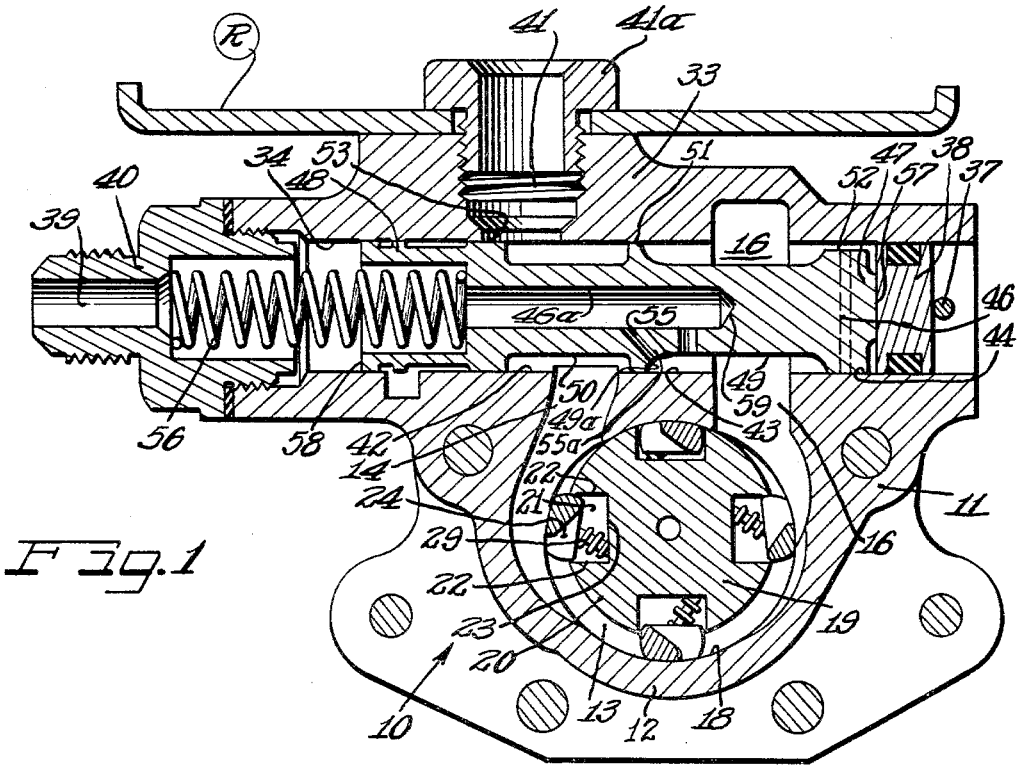

May 31, 1966     G. H. DRUTCHAS     3,253,607

COMBINATION PUMP AND FLOW REGULATOR

Filed June 10, 1964

INVENTOR.

Gilbert H. Drutchas

BY

ATTORNEYS

United States Patent Office
3,253,607
Patented May 31, 1966

3,253,607
COMBINATION PUMP AND FLOW REGULATOR
Gilbert H. Drutchas, Birmingham, Mich., assignor to TRW Inc., a corporation of Ohio
Filed June 10, 1964, Ser. No. 374,122
3 Claims. (Cl. 137—117)

This disclosure constitutes a continuation-in-part of my copending application Serial No. 840,703 filed Sept. 17, 1959, now Patent No. 3,146,719.

As disclosed in my acknowledged application, in power assisting systems such as a power steering system for an automotive vehicle, it is desirable to reduce the flow of hydraulic fluid in the system at high operating speeds, at which time the steering effort is small and the heat rise due to excessive flow of the pumping medium being worked upon is high.

The present disclosure shows another form of the invention wherein two separate orifices are provided through which pump outlet flow passes to a point of utilization.

The separate orifices are formed in a flow control valve situated in the line and responsive to a pressure differential between two separated points that is proportional to the flow. Thus, the higher pressure at one zone urges the flow control valve in one direction against a reference spring. When the flow and thence the pressure differential become sufficient, the valve moves sufficiently to connect the pump outlet to the inlet, thereby by-passing a portion of the pump discharge and effecting flow control.

Two separate orifices formed in the flow control valve are equally effective as long as the valve is closed and there is no by-pass flow between the inlet and the outlet. When by-pass flow occurs, however, the second orifice is located in such a position as to be in an aspirating position so the second orifice becomes less effective because of the fluid flow by its mouth and its effectiveness becomes less and less as the by-pass flow is increased and the flow control valve is shifted. Decreasing the effectiveness of the second orifice has the same result as decreasing the orifice size and since a smaller orifice requires less line flow to attain the same pressure differential, the pressure differential will increase, thereby opening the valve further. Accordingly, a drooping flow characteristic at higher speed is attained.

It is an object of the present invention, therefore, to provide improved methods and apparatus for flow regulation in a hydraulic system.

Another object of the present invention is to provide a method and apparatus for controlling flow wherein a linearly movable spool valve which is normally flow responsive is additionally biased as a function of valve position.

A further object of the present invention is to provide flow regulating means using a second orifice which is arranged to become less effective because of liquid flow past its mouth as by-pass flow is increased and as a function of the control valve linear displacement.

Another object of the present invention is to provide an arrangement for increasing the pressure differential in the control valve as a function of the linear displacement of the valve, thereby affording a drooping flow characteristic at higher speeds.

Many other features, advantages and additional objects of the present invention will become manifest to those versed in the art upon making reference to the detailed drawings in which a preferred structural embodiment of a combined pump and flow regulator is shown by way of illustrative example.

Figure 2:
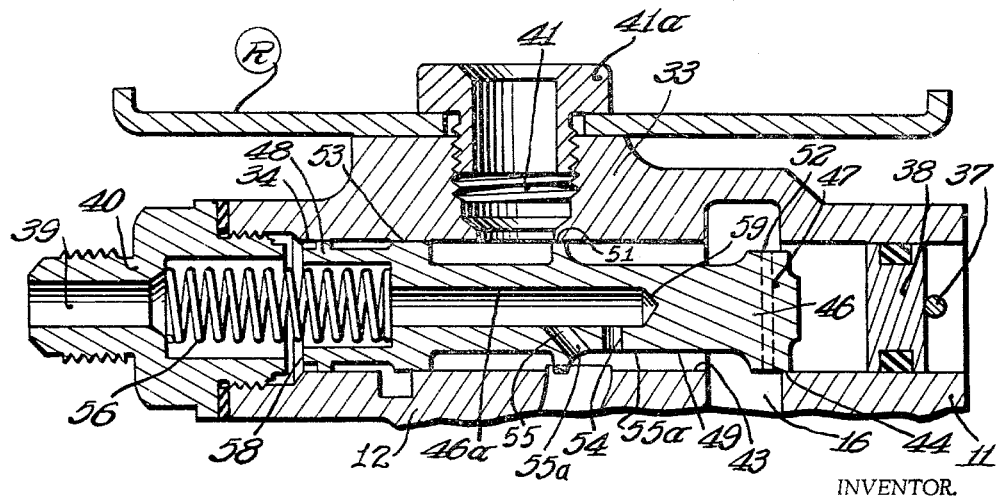

On the drawings:
FIGURE 1 is a cross-sectional view with parts shown in elevation of a combined pump and flow regulator embodying the principles of the present invention; and
FIGURE 2 is a fragmentary view similar to FIGURE 1 and showing the flow regulator in an adjusted position.

As shown on the drawings:
An integral combined pump and flow regulator is indicated generally at 10 and includes a casing 11 forming a pump housing 12 having a pumping chamber 13 formed with an inlet 14 and an outlet 16.

A rotor 19 is rotatable within the pumping chamber 13 and is formed with a peripheral surface 20 characterized by formation therein of a series of axially extending notches or recesses 21 each having side walls 22, 22 and a bottom wall 23, thereby to receive for rocking and reciprocatory movement therein a slipper member 24.

A continuous biasing means taking the form of a coil spring 29 is bottomed at one end against the wall 23 in each respective recess 21 and is bottomed at the opposite end against a slipper member 24, thereby to normally preload and continuously bias the slipper member outwardly into contact with a bore wall 18 formed in the pumping chamber.

The bore 18 together with the rotor 19 forms a working chamber which is preferably crescent shaped since the bore 18 and the rotational axis of the rotor 19 are eccentrically offset with respect to one another. Accordingly, upon rotation of the rotor 19, the space between an adjoining set of slipper members 24, 24 will be expanding on the inlet side of the pump, thereby to fill such space with fluid from the inlet 14 and the fluid will be discharged under increased pressure through the pump outlet 16.

In accordance with the principles of the present invention, the fluid flow is regulated by a flow regulator contained within an enlarged boss 33 formed on the upper part of the casing 11. In the illustrative embodiment herein disclosed by way of example, it is contemplated that the combination pump and flow regulator is incorporated into a hydraulic circuit of a power assisting device such as the steering system of an automotive vehicle. Thus, the pump operates to drive a stream of pressurized fluid through the circuit for use at a point of utilization which consists of a power assisting device such as the power steering unit.

As shown in FIGURES 1 and 2, the boss 33 has a bore 34 formed therein. A recess is formed near one end of the bore 34 and receives a pin 37, thereby to position and retain a closure cap 38 closing one end of the bore 34.

At the opposite end of the bore 34, there is provided a nipple 40 having a discharge opening 39 to which may be connected a conduit leading to a point of utilization.

The boss 33 is further provided with an inlet opening 41 connected by means of a fitting 41a to a reservoir R. On opposite sides of the inlet opening 41 and the pump inlet 14 there is formed by the walls of the bore 34 control lands indicated at 42 and 43, respectively, the bore 34 providing additional control lands indicated at 44 on the opposite side of the outlet 16.

Furthermore, a spool valve member indicated generally at 46 is movable for linear adjustment on a valve axis extending through the bore 34. The spool valve member 46 includes a head portion 47 and axially extending walls 48 formed with a pair of circumferential recesses 49 and 50 separated by a valve land 51 and including additional valve lands shown at 52 and 53 at opposite ends for cooperating with the lands 42, 43, 44 and for thereby effecting a valve control action upon linear adjustment of the spool valve 46 and the bore 34.

In accordance with this particular form of the invention, the walls 48 of the spool valve member 46 are formed with two separate orifices interconnecting the hollow center portion of the spool valve 46 and the recess 49 in register with the outlet 16 and through which fluid dicharged by the pump flows to the outlet 39, 40.

The first orifice is indicated at 54 and it will be noted the orifice 54 is disposed to extend radially and is located most closely to the head 47 and the valve. The second orifice is shown at 55 and is spaced towards one end of the recess 49 a short axial distance away from the orifice 54. It will be noted that the orifice 55 has a mouth 55a spaced directly adjacent a shoulder 49a of the end of the recess and the opposite end of the orifice 55 is spaced axially so that the orifice 55 is disposed angularly and intersects a bore wall 46a of the hollow center portion of the spool valve 46. Thus, as is illustrated in FIGURE 2, when the valve 46 is shifted to the left and by-pass flow occurs from the outlet 16 to the inlet 14, the second orifice 55 becomes less effective because of the fluid flow by its mouth 55a and its effectiveness becomes less and less as the by-pass flow is increased and as the valve 46 is shifted to the left. Decreasing the effectiveness of the second orifice 55 has the same result as decreasing the orifice size in the usual flow control arrangement since a smaller orifice requires less line flow to attain the same pressure differential. This causes the pressure differential acting on the flow control valve 46 to increase, thus opening the valve 46 further, increasing the by-pass flow from the outlet 16 to the inlet 14 and decreasing the flow in the line.

In order to preload the spool valve 46 for control purposes, there is provided a continuous biasing means taking the form of a coil spring 56, one end of which is bottomed against a wall portion of the valve 46 and the other end of which operatively engages the casing 11 by engaging against the nipple 40 connected to the boss 33, thereby to bias the spool valve 46 towards a normally closed position wherein all flow discharged by the pump is directed through the two separate orifices 54 and 55 and into the line via the bore 46a and the discharge opening 39.

It will be understood that fluid flow from the pump outlet 16 through the flow control valve orifices 54 and 55 creates a pressure differential on opposite sides of the orifices 54 and 55. Thus, the land 52 may be relieved so that the pump outlet pressure will be communicated to the rear surface of the valve and will act on the rear motive surface shown at 57. When a higher pressure acting on the surface 57 urges the flow control valve 46 to the left in opposition to the summation of the forces exerted by the coil spring 56 and the lower pressure acting on the end face and shoulder 58 and on a bottom wall 59, the valve 46 will be moved towards the position illustrated in FIGURE 2 wherein the recess 49 interconnects the pump outlet 16 directly with the pump inlet 14, thereby directly by-passing excess pump discharge to the pump inlet to maintain a constant flow in the line communicating with the discharge outlet 39. As pump speed increases, the amount of such excess discharge also increases, thereby requiring the valve 46 to move further to the left. Thus, such linear adjustment as effected by virtue of the pressure differential on opposite sides of the orifices 54 and 55 is a function of pump speed or, in terms of the actual variable controlling such adjustment, a function of the pressure differential on opposite sides of the flow orifice 54 and 55.

As noted above, an additional biasing force is introduced to act on the valve 46 which biasing force is a function of the valve position and which operates by increasing the pressure differential to open the valve further and increase the by-pass flow and decrease the flow in the line. Since pump outlet flow is responsible for the events described hereinabove, and since outlet flow is a function of pump speed, this arrangement will cause proportionally more fluid to be by-passed and less flow in the line as the pump speed is increased, thereby attaining a drooping flow characteristic at higher speeds.

Such provision is particularly desirable in a power steering system since it is desirable to reduce the flow of hydraulic fluid in the system at high speed, at which time the steering effort is small and the heat rise due to excessive flow work is high.

Although minor modifications might be suggested by those versed in the art, it should be understood that I wish to embody within the scope of the patent warranted hereon all such modifications as reasonably and properly come within the scope of my contribution to the art.

I claim as my invention:

1. A flow regulator comprising
    a cylindrical chamber having spaced inlet and by-pass openings and a by-pass passage,
        said chamber further including an outlet opening,
    and a spool valve in said chamber having a pair of orifices both communicating with said inlet and outlet at a first position wherein said by-pass passage is closed,
    said valve being constructed to move in said chamber by differential pressure between said inlet and outlet towards a second position wherein said by-pass opening is communicated with said inlet by said by-pass passage,
    one of said orifices being spaced with respect to said inlet to continue communication with said outlet at said second position,
    the other of said orifices being spaced to move into partial registration with said by-pass opening as said valve opens said by-pass passage,
    said other of said orifices being so located with respect to said by-pass passage in its open position as to effect an aspirating action on said other orifice,
    thereby producing a drooping flow characteristic in said flow regulator.

2. A flow regulator as defined in claim 1 and further characterized by
    said spool valve having a head portion and axially extending walls formed with a pair of circumferential recesses separated by a circumferential land,
    one of said recesses communicating with said by-pass opening and the other of said recesses forming said by-pass passage and said land separating said inlet and by-pass openings when said valve is at said first position,
    said spool valve having a hollow center portion through which fluid is discharged to said outlet opening,
    said other of said orifices extending angularly between the hollow center portion of said spool valve to said other of said recesses adjacent said land.

3. A flow regulator as defined in claim 2 and further characterized by
    means forming a reservoir opening communicating with said one of said recesses,
    thereby to supply fluid to said by-pass passage.

References Cited by the Examiner
UNITED STATES PATENTS

| 1,994,320 | 3/1935 | McLaughlin | 137—484.2 X |
| 2,225,880 | 12/1940 | Montelius | 137—484.2 |
| 2,997,888 | 4/1961 | Livermore | 103—136 X |

ISADOR WEIL, Primary Examiner.

WILLIAM F. O'DEA, MARTIN P. SCHWADRON, Examiners.

J. G. O'NEILL, Assistant Examiner.